Patented Oct. 25, 1932

1,884,124

UNITED STATES PATENT OFFICE

PAUL I. MURRILL, OF EAST NORWALK, CONNECTICUT, ASSIGNOR TO R. T. VANDERBILT COMPANY, INCORPORATED, OF NEW YORK, N. Y., A CORPORATION OF NEW YORK

ART OF VULCANIZING RUBBER

No Drawing.    Application filed April 1, 1930.   Serial No. 440,859.

This invention relates to the vulcanization of rubber and includes the new vulcanization products as well as the new vulcanization process.

According to the present process the vulcanization is carried out with the addition to the rubber of a vulcanizing agent of the sulfur group and an organic tellurium compound containing the group —CSS—.

The new organic tellurium compounds used in the process of the present invention and in making the new vulcanized products of the invention have the following general formula: $(-CSS)_4Te$ and they contain nitrogen, oxygen or carbon joined to the carbon of the above formula. Among the new vulcanizing agents which are particularly valuable for use in carrying out the invention are the tellurium salts or compounds of diethyl- and dimethyldithiocarbamic acid of the general formula: $(RR'N.CSS)_4Te$ where R and R' represent simple or substituted hydrocarbon radicals which may be the same or different radicals such as methyl, ethyl, phenyl, benzyl, etc., or where RR'N represents piperidyl, etc. Similar tellurium compounds can be derived from the xanthic acids of the general formula $(RO.CSS)_4Te$ and from dithioacetic acid dithiobenzoic acid, etc., of the general formula $$(\equiv C.CSS)Te.$$

The new tellurium compounds can be produced in accordance with the process more fully described in my companion application Serial No. 440,860, filed of even date by the action of a soluble tellurite such as sodium tellurite upon the sodium salt of the dithioacid with the addition of a mineral or organic acid such as hydrochloric acid. The tellurium diethyl- and dimethyl-dithiocarbamates may be produced, for example, by the reaction of the sodium diethyl- or dimethyldithiocarbamate (4 mols.) upon sodium tellurite (1 mol.) and hydrochloric acid (6 mols.). The tellurium diethyldithiocarbamate is a bulky orange-yellow precipitate with a melting point of about 121–122° C. This crude product can be used directly in the treatment of rubber or it can be recrystal- lized from alcohol or benzol. The pure product melts at 123–124° C.

The new organic tellurium compounds when used in the vulcanization of rubber together with a member of the sulfur group are compounded with the rubber mix in the usual way and used to the extent of a small fraction of 1% for example ⅛ to ¼% of the rubber.

The following specific examples further illustrate the invention. They show a comparison of the results obtained by vulcanizing rubber with the new organic tellurium compounds and a member of the sulfur group as compared with rubber mixes containing sulfur and other well-known accelerators, namely mercaptobenzothiazole and tetramethylthiuram disulfide.

| Formula: | #1 | #2 | #3 | #4 | #5 | #6 | #7 |
|---|---|---|---|---|---|---|---|
| Smoked sheets | 50 | 50 | 50 | 50 | 50 | 50 | 50 |
| Pale crepe | 50 | 50 | 50 | 50 | 50 | 50 | 50 |
| Zinc oxide | 5 | 5 | 5 | 5 | 5 | 5 | 5 |
| Stearic acid | 2 | 2 | 2 | 2 | 2 | 2 | 2 |
| Sulfur | 3 | 3 | 3 | 1½ | 1½ | 3 | 3 |
| Selenium | | | | 1 | | | |
| Tellurium | | | | | 1 | | |
| Mercaptobenzothiazole | 1 | | | | | | |
| (Et₂N.CSS)₄Te | | | ¼ | ¼ | ¼ | | ¼ |
| Me₂N.CS.S.S.CS.NMe | | ¼ | | | | ¼ | |

These mixes were cured at 40 lbs. steam pressure (141° C.) for the time indicated.

| | 5 minutes | | | 10 minutes | | | 15 minutes | | |
|---|---|---|---|---|---|---|---|---|---|
| #1 | | | | | 1630 | 920 | 150 | 2140 | 855 |
| #2 | 240 | 2800 | 820 | 400 | 3850 | 780 | 460 | 3750 | 750 |
| #3 | 180 | 1600 | 845 | 225 | 2630 | 710 | 355 | 3600 | 800 |
| #4 | 155 | 1820 | 855 | 350 | 3020 | 790 | 465 | 3660 | 735 |
| #5 | 80 | 1450 | 880 | 195 | 2420 | 840 | 280 | 3150 | 820 |
| #6 | 350 | 3510 | 780 | 375 | 3840 | 780 | 415 | 3810 | 760 |
| #7 | 260 | 2860 | 820 | 350 | 3580 | 800 | 460 | 3730 | 750 |

| | 30 minutes | | | 45 minutes | | |
|---|---|---|---|---|---|---|
| #1 | 220 | 2960 | 810 | 380 | 3180 | 760 |
| #2 | 360 | 3600 | 810 | 330 | 3320 | 800 |
| #3 | 555 | 3390 | 730 | 555 | 3500 | 735 |
| #4 | 535 | 3450 | 690 | 540 | 3380 | 730 |
| #5 | 320 | 3450 | 815 | 330 | 3320 | 780 |
| #6 | 360 | 3470 | 800 | 280 | 2800 | 815 |
| #7 | 580 | 4000 | 740 | 580 | 3580 | 730 |

Three figures are given for each mix. The first denotes the tensile strength at 500% elongation; the second denotes tensile strength at break; and the third denotes elongation at break.

The tests on mixes #8, #9 and #10 show that tellurium diethyldithiocarbamate is an ultra accelerator which works well with carbon black.

| Formula: | #8 | #9 | #10 |
|---|---|---|---|
| Smoked sheets | 100 | 100 | 100 |
| Zinc oxide | 5 | 5 | 5 |
| Carbon black | | | 40 |
| Stearic acid | 2 | 2 | 4 |
| Sulfur | 2 | 3 | 3 |
| Mercaptobenzothiazole | 1 | | |
| $(Et_2N.CSS)_4Te$ | | ¼ | ¼ |

| Cure at 40 lbs.: | #8 | | | #9 | | | #10 | | |
|---|---|---|---|---|---|---|---|---|---|
| Minutes | | | | | | | | | |
| 5 | No cure | | | 235 | 2760 | 850 | *470 | 2430 | 680 |
| 10 | No cure. | | | 380 | 3270 | 790 | 580 | 3100 | 680 |
| 15 | Undercure. | | | 455 | 3510 | 800 | 760 | 3480 | 650 |
| 30 | 80 | 530 | 970 | 600 | 4150 | 745 | 1140 | 4050 | 610 |
| 45 | 115 | 1300 | 860 | 690 | 3950 | 740 | 1310 | 3910 | 550 |
| 60 | 160 | 1890 | 840 | 630 | 3800 | 730 | 1320 | 3080 | 540 |

* 470 is tensile at 300% elongation instead of 500% elongation.

From these examples it will be seen that the new organic tellurium compounds when used together with a member of the sulfur group are rapid in their action causing cures at low temperature and in a short time. The new vulcanized products have improved properties.

I claim:

1. The method of vulcanizing rubber, which comprises subjecting rubber to vulcanization with the addition thereto of a member of the sulfur family as a vulcanizing agent and an organic tellurium compound containing the following group: —CSS— as an accelerator.

2. The method of vulcanizing rubber, which comprises subjecting the rubber to vulcanization with the addition thereto of sulfur and an organic tellurium compound containing the following group: —CSS— as an accelerating agent.

3. The method of vulcanizing rubber, which comprises subjecting the rubber to vulcanization with the addition thereto of a member of the sulfur family as a vulcanizing agent and an organic tellurium compound of the following general composition: $(—CSS)_4Te$ as an accelerating agent.

4. The method of vulcanizing rubber, which comprises subjecting the rubber to vulcanization with the addition thereto of sulfur as a vulcanizing agent and an organic tellurium compound of the following general composition: $(—CSS)_4Te$ as an accelerating agent.

5. The method of vulcanizing rubber, which comprises subjecting the rubber to vulcanization with the addition thereto of a member of the sulfur family as a vulcanizing agent and as an accelerating agent an organic tellurium compound of the following general formula: $(RR'N.CSS)_4Te$ where R and R' are hydrocarbon radicals.

6. The method of vulcanizing rubber, which comprises subjecting the rubber to vulcanization with the addition thereto of a member of the sulfur family as a vulcanizing agent and as an accelerating agent an organic tellurium compound of the following general formula: $(RO.CSS)_4Te$ in which R is a hydrocarbon radical.

7. The method of vulcanizing rubber, which comprises subjecting the rubber to vulcanization with the addition thereto of a member of the sulfur family as a vulcanizing agent and as an accelerating agent an organic tellurium compound of the following general formula: $(\equiv C.SS)_4Te$.

8. The method of vulcanizing rubber, which comprises subjecting the rubber to vulcanization with the addition thereto of a member of the sulfur family as a vulcanizing agent and with tellurium dialkyldithiocarbamate as an accelerating agent.

9. The method of vulcanizing rubber, which comprises subjecting the rubber to vulcanization with the addition thereto of sulfur as a vulcanizing agent and tellurium diethyldithiocarbamate as an accelerator.

10. New vulcanized rubber products vulcanized with the addition thereto before vulcanization of a member of the sulfur family and an organic tellurium compound containing the following group: —CSS—.

11. New vulcanized rubber products vulcanized with the addition thereto before vulcanization of a member of the sulfur family and an organic tellurium compound of the following general composition: $(—CSS)_4Te$.

12. New vulcanized rubber products vulcanized with the addition thereto before vulcanization of a member of the sulfur family and an organic tellurium compound of the following general formula: $(RR'N.CSS)_4Te$ where R and R' are hydrocarbon radicals.

13. New vulcanized rubber products vulcanized with the addition thereto before vulcanization of a member of the sulfur family and an organic tellurium compound of the following general formula: $(RO.CSS)_4Te$ in which R is a hydrocarbon radical.

14. New vulcanized rubber products vulcanized with the addition thereto before vulcanization of a member of the sulfur family and an organic tellurium compound of the following general formula: $(\equiv C.CSS)_4Te$.

In testimony whereof I affix my signature.

PAUL I. MURRILL.

Certificate of Correction

Patent No. 1,884,124. October 25, 1932.

PAUL I. MURRILL

It is hereby certified that error appears in the printed specification of the above-numbered patent requiring correction as follows: Page 1, line 78, in the boxed formula, first column, for " $Me_2N.CS.S.S.CS.NMe$ " read $Me_2N.CS.S.S.CS.NMe_2$; page 2, line 84, claim 7, for " $=C.SS)_4Te$." read ( $=C.SS)_4Te$.; and that the said Letters Patent should be read with these corrections therein that the same may conform to the record of the case in the Patent Office.

Signed and sealed this 17th day of January, A. D. 1933.

[SEAL.]

M. J. MOORE,
*Acting Commissioner of Patents.*